(12) United States Patent
Rajan et al.

(10) Patent No.: US 9,667,712 B2
(45) Date of Patent: *May 30, 2017

(54) MECHANISM FOR FACILITATING SPIN MODE-BASED DYNAMIC UPDATING OF APPLICATION SERVERS IN AN ON-DEMAND SERVICES ENVIRONMENT

(71) Applicant: salesforce.com, inc., San Francisco, CA (US)

(72) Inventors: Karthik Rajan, Foster City, CA (US); Pallav Kothari, San Francisco, CA (US); Scott Hansma, San Francisco, CA (US)

(73) Assignee: salesforce.com, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/997,354

(22) Filed: Jan. 15, 2016

(65) Prior Publication Data

US 2016/0173583 A1    Jun. 16, 2016

Related U.S. Application Data

(63) Continuation of application No. 14/473,593, filed on Aug. 29, 2014, now Pat. No. 9,288,108, which is a
(Continued)

(51) Int. Cl.
*H04L 29/08* (2006.01)
*G06F 9/44* (2006.01)
(Continued)

(52) U.S. Cl.
CPC ............ *H04L 67/1012* (2013.01); *G06F 8/00* (2013.01); *G06F 8/67* (2013.01); *H04L 12/00* (2013.01);
(Continued)

(58) Field of Classification Search
CPC ....... H04L 41/082; H04L 67/10; H04L 45/22; G06F 8/67; G06F 8/00; G06F 3/123;
(Continued)

(56) References Cited

U.S. PATENT DOCUMENTS 5,577,188 A    11/1996   Zhu
5,608,872 A    3/1997   Schwartz et al.
(Continued)

OTHER PUBLICATIONS

Non-Final Office Action for U.S. Appl. No. 13/345,331 mailed May 23, 2013, 9 pages.
(Continued)

*Primary Examiner* — Ario Etienne
*Assistant Examiner* — Kidest Mendaye
(74) *Attorney, Agent, or Firm* — Alpine Technology Law Group, LLC

(57) ABSTRACT

In accordance with embodiments, there are provided mechanisms and methods for facilitating spin mode-based dynamic updating of application servers in an on-demand services environment. In one embodiment and by way of example, a method includes upgrading a first set of application servers of a plurality of application servers at one or more computing devices, holding a first set of requests received at the first set of application servers from being processed while the first set of application servers is being upgraded, and upgrading a second set of application servers of the plurality of application servers upon completion of the first set of application servers. The method may further include holding a second set of requests received at the second set of application servers from being processed while the second set of application servers is being upgraded, and resuming processing of the first set of requests at the upgraded first set of application servers.

12 Claims, 7 Drawing Sheets

Related U.S. Application Data continuation of application No. 13/345,331, filed on Jan. 6, 2012, now Pat. No. 8,849,887.

(60) Provisional application No. 61/528,513, filed on Aug. 29, 2011.

(51) Int. Cl.
*H04L 12/00* (2006.01)
*G06F 9/445* (2006.01)
*H04L 12/24* (2006.01)
*H04L 12/707* (2013.01)

(52) U.S. Cl.
CPC ............ *H04L 41/082* (2013.01); *H04L 45/22* (2013.01); *H04L 67/10* (2013.01); *H04L 67/32* (2013.01)

(58) Field of Classification Search
CPC ...... G06F 3/0607; G06F 11/1433; G06F 8/70; G06F 8/71
See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,397,352 B1 | 5/2002 | Chandrasekaran et al. |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,155,462 B1 * | 12/2006 | Singh ................... G06F 8/65 707/695 |
| 7,289,976 B2 | 10/2007 | Kihneman et al. |
| 7,340,411 B2 | 3/2008 | Cook |
| 7,620,655 B2 | 11/2009 | Larsson et al. |
| 8,296,267 B2 | 10/2012 | Cahill et al. |
| 8,386,501 B2 | 2/2013 | Cahill et al. |
| 8,417,737 B2 * | 4/2013 | Hopmann ........ G06F 17/30297 707/803 |
| 8,423,662 B1 | 4/2013 | Weihl et al. |
| 8,572,595 B1 | 10/2013 | Lethin et al. |
| 8,589,090 B2 | 11/2013 | Ruiter et al. |
| 8,589,909 B2 | 11/2013 | Hu et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0140339 A1 | 7/2003 | Shirley |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0204564 A1 * | 10/2003 | Keene ................ G06F 17/50 709/203 |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |

(56) References Cited

U.S. PATENT DOCUMENTS

| | | |
|---|---|---|
| 2005/0050555 A1 | 3/2005 | Exley et al. |
| 2005/0091098 A1 | 4/2005 | Brodersen et al. |
| 2006/0031420 A1* | 2/2006 | Ferguson ............... H04L 67/34 709/219 |
| 2006/0190581 A1 | 8/2006 | Hagale et al. |
| 2009/0177744 A1 | 7/2009 | Marlow et al. |
| 2010/0162226 A1* | 6/2010 | Borissov .................. G06F 8/67 717/173 |
| 2010/0313063 A1* | 12/2010 | Venkataraja .......... G06F 9/5072 714/4.1 |

OTHER PUBLICATIONS

Final Office Action for U.S. Appl. No. 13/345,331 mailed Dec. 11, 2013, 12 pages.
Notice of Allowance for U.S. Appl. No. 13/345,331 mailed May 27, 2014, 18 pages.

* cited by examiner

MECHANISM FOR FACILITATING SPIN MODE-BASED DYNAMIC UPDATING OF APPLICATION SERVERS IN AN ON-DEMAND SERVICES ENVIRONMENT

CLAIM OF PRIORITY

This is a continuation application of U.S. patent application Ser. No. 14/473,593, entitled "MECHANISM FOR FACILITATING SPIN MODE-BASED DYNAMIC UPDATING OF APPLICATION SERVERS IN AN ON-DEMAND SERVICES ENVIRONMENT", by Karthik Rajan, et al., filed Aug. 29, 2014, now allowed, which is a continuation application of U.S. patent application Ser. No. 13/345,331, entitled "MECHANISM FOR FACILITATING SPIN MODE-BASED DYNAMIC UPDATING OF APPLICATION SERVERS IN AN ON-DEMAND SERVICES ENVIRONMENT", by Karthik Rajan, et al., filed Jan. 6, 2012, now issued as U.S. Pat. No. 8,849,887, which claims the benefit of and priority to U.S. Provisional Patent Application No. 61/528,513, entitled "METHODS AND SYSTEMS FOR ZERO DOWNTIME USING A SPIN MODE IN AN ON-DEMAND SERVICE ENVIRONMENT", by Karthik Rajan, filed Aug. 29, 2011, the benefit of and priority to all aforementioned applications are claimed thereof and the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management and, more specifically, to a mechanism for facilitating spin mode-based dynamic updating of application servers in an on-demand services environment.

BACKGROUND

It is well-known that updating of application servers can cause plenty of downtime that is expensive and inefficient. Although several attempts have been made to simplify this often complex process of updating an application server, these attempts have not been successful in significantly reducing the downtime associated with the process.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

SUMMARY

In accordance with embodiments, there are provided mechanisms and methods for facilitating spin mode-based dynamic updating of application servers in an on-demand services environment. In one embodiment and by way of example, a method includes upgrading a first set of application servers of a plurality of application servers at one or more computing devices, holding a first set of requests received at the first set of application servers from being processed while the first set of application servers is being upgraded, and upgrading a second set of application servers of the plurality of application servers upon completion of the first set of application servers. The method may further include holding a second set of requests received at the second set of application servers from being processed while the second set of application servers is being upgraded, and resuming processing of the first set of requests at the upgraded first set of application servers.

While the present invention is described with reference to an embodiment in which techniques for facilitating management of data in an on-demand services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, one or more implementations are not limited to the examples depicted in the figures.

DETAILED DESCRIPTION

Methods and systems are provided for facilitating spin mode-based dynamic updating of application servers in an on-demand services environment. In one embodiment and by way of example, a method includes upgrading a first set of application servers of a plurality of application servers at one or more computing devices, holding a first set of requests received at the first set of application servers from being processed while the first set of application servers is being upgraded, and upgrading a second set of application servers of the plurality of application servers upon completion of the first set of application servers. The method may further include holding a second set of requests received at the second set of application servers from being processed while the second set of application servers is being upgraded, and resuming processing of the first set of requests at the upgraded first set of application servers.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for spin mode-based dynamic updating of application servers in an on-demand service environment having a multi-tenant database system will be described with reference to example embodiments.

Figure 1:
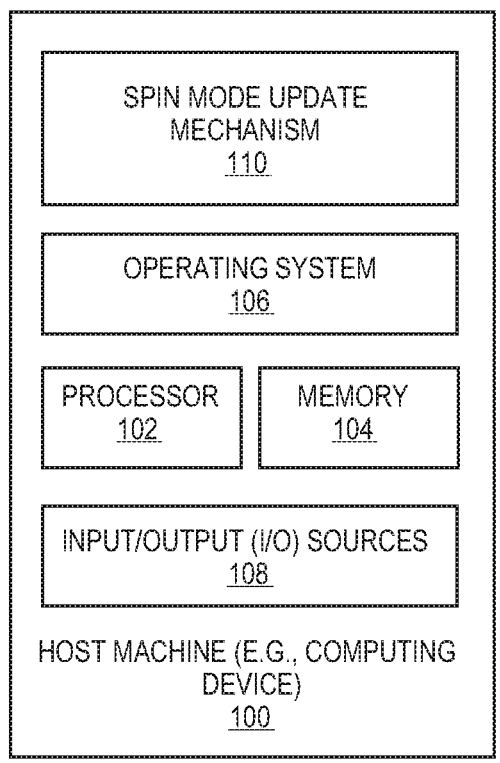
FIG. 1 illustrates a computing system employing a spin mode update mechanism according to one embodiment.

FIG. 1 illustrates a computing system employing a spin mode update mechanism according to one embodiment. In one embodiment, a computing device 100 serves as a host machine hosting a spin mode update mechanism ("spin mode mechanism") 110 to facilitate dynamic, customized, and efficient updating of application servers without having to require any downtime. Computing device 100 serving as a host machine may include server computers, desktop computers, cluster-based computers, laptop computing devices (e.g., notebooks, netbooks, etc.), set-top boxes (e.g., Internet-based cable television set-top boxes, etc.), and the like. Computing device 100 may also include mobile computing devices, such as cellular phones including smartphones (e.g., iPhone®, BlackBerry®, etc.), handheld computing devices, personal digital assistants (PDAs), etc., tablet computers (e.g., iPad®, Samsung® Galaxy Tab®, etc.), laptop computers, e-readers (e.g., Kindle®, Nook®, etc.), Global Positioning System (GPS)-based navigation systems, etc.

Computing device 100 includes an operating system 106 serving as an interface between any hardware or physical resources of the computer device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "node", "computing node", "client", "client device", "server", "server device", "machine", "host machine", "device", "computing device", "computer", "computing system", "multi-tenant on-demand data system", and the like, are used interchangeably and synonymously throughout this document. It is to be further noted that terms like "application", "software application", "program", "software program", "package", and "software package" are used interchangeably and synonymously throughout this document.

Figure 2:
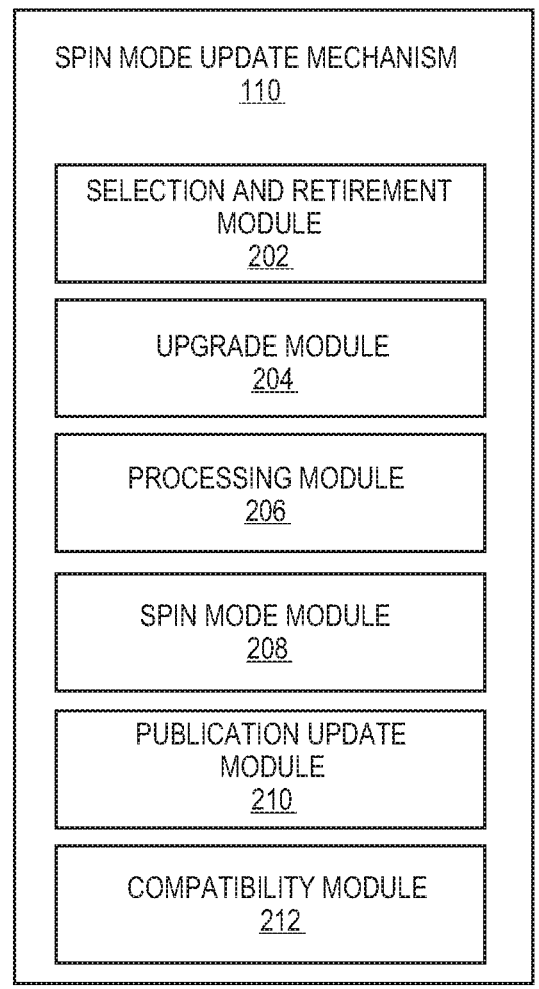
FIG. 2 illustrates a spin mode update mechanism employed at a computing device according to one embodiment.

FIG. 2 illustrates a spin mode update mechanism employed at a computing device according to one embodiment. In one embodiment, a spin mode update mechanism 110 includes various components 202, 204, 206, 208, 210 and 212 to offer a number of services to facilitate zero downtime update of application servers in a multi-tenant database system in an on-demand services environment. The spin mode mechanism 110 includes a selection and retirement module 202 to select any number of application servers for updating. For example, a cluster of 10 application servers may need an updating to a new version. Using this example, a selection and retirement module 202 of the spin mode mechanism 110 may choose one or more application servers from the cluster as a first set of application servers (e.g., 5 application servers labeled as application servers 1-5) that are to be upgraded to the new version. Once selected, the selection and retirement module 202 retires the first set of application servers to be updated.

The retired application servers of the first set are then upgraded to the new version by an upgrade module 204. While the first set of application servers is being upgraded to the new version, a processing module 206 facilitates the remaining application servers (e.g., the remaining 5 application servers labeled as servers 6-10) of the cluster to continue to process any processing requests received at the remaining application servers 6-10. This way, the processing of these requests is consistent with the published version of application servers that is the current version of application servers 6-10 (because they have yet to be upgraded to the new version). The published version may be published by a system or database associated with the entire cluster of application servers, such as application servers 1-10.

While these processing requests get processed by the second set of application servers, any processing requests being received at the first set of application servers are put on hold in a first spin mode by a spin mode module 208. In addition to having a virtually zero downtime when upgrading application servers, this novel spin mode technique also prevents the processing requests from getting processed by multiple versions of application servers. A processing request refers to any request that is received from a user and that requires an application server to provide services, such as a user placing a request, via a computing device, to surf a website, etc.

Once the upgrading or updating of the first set of application servers is completed, the second set of application servers is retired, by the selection and retirement module 202, for potential upgrading or updating. It is to be noted that words like "upgrade" and "update" may be used interchangeably and synonymously throughout the document. Once the second set of application servers is retired, any processing request being received at any of the application servers 6-10 of the second set are put on hold in a second spin mode by the spin mode module 208. This is again so that the downtime can be reduced to zero while at the same time preventing the processing requests from being processed by multiple versions of application servers. A publication update module 210 updates the published version to be the same (e.g., version 2) as that of the recently upgraded application servers 1-5 of the first set of application servers. In one embodiment, the spin mode module 208 ends the first spin mode holding the processing requests bound for the first set of application servers from being processed so that those and any new processing request for the first set can now be processed by the new version of the newly-upgraded first set of application servers 1-5.

Similarly, once the second set of application servers is upgraded to the new version, the second spin mode is terminated by the spin mode module 208 so that any processing requests on hold and any new processing requests being received at the second set of application servers can now be processed by the new-versioned newly-upgraded second set of application servers 6-10. In one embodiment, using the aforementioned techniques of the spin mode upgrade mechanism 110, the entire cluster of application servers is upgraded with zero downtime and in a way that any processing requests received at these application servers are processed by the single published version of the application servers.

The spin mode update mechanism 110 further includes a compatibility module 212 to allow the spin mode update mechanism 110 to be dynamically and automatically compatible with any type of Internet or hotspot service providers (e.g., telecommunication companies, Internet service providers, etc.), computer devices (e.g., computer device 100 of FIG. 1), application servers (such as by Java®, Oracle (e.g., WebLogic®, etc.), International Business Machines (IBM®) (e.g., WebSpere®, etc.), Microsoft® (e.g., .NET® Framework, etc.), SAP® (e.g., Application Business Application Programming (ABAP®), etc.), Hypertext Preprocessor (PHP®), etc., and the like.

It is contemplated that any number and type of components may be added to and removed from the spin mode update mechanism 110 to facilitate zero downtime dynamic upgrade of application servers. For brevity, clarity, ease of understanding and to stay focused on the spin mode update mechanism 110, many of the standard or known components, such as those of a computing device, are not shown or discussed here. It is contemplated that embodiments of the invention are not limited to any particular technology or standard and is dynamic enough to adopt and adapt to the changing technology and standards.

Figure 3:
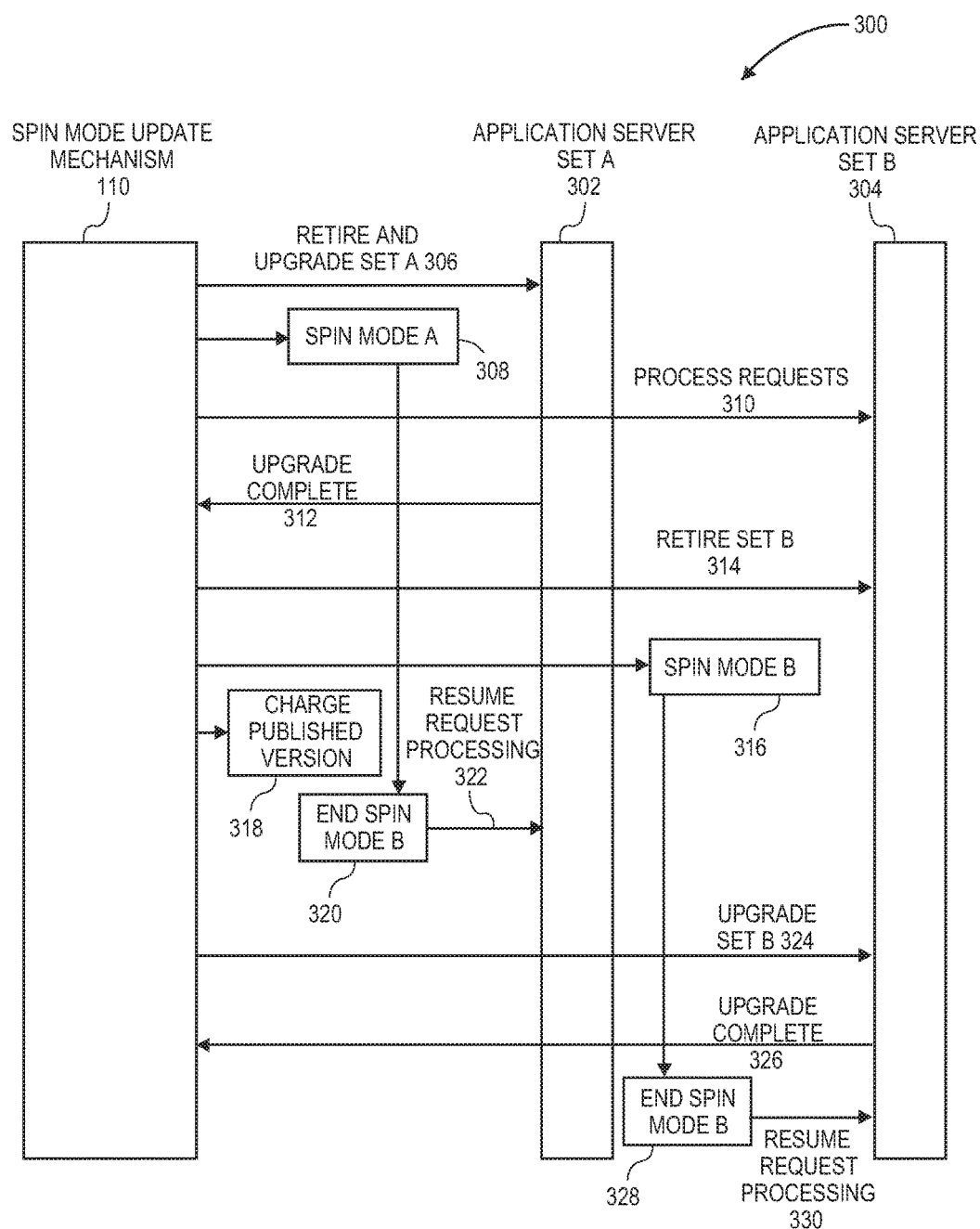
FIG. 3 illustrate a transaction sequence for performing spin mode-based dynamic updating of application servers using a spin mode update mechanism according to one embodiment.

FIG. 3 illustrates a transaction sequence for performing spin mode-based dynamic updating of application servers using a spin mode update mechanism according to one embodiment. In the illustrated transaction sequence 300, the spin mode update mechanism 110 retires 306 set A 302 of a cluster of application servers for a potential upgrade to a new version. Having retired set A 302, any processing requests received being received at set A 302 are put in spin mode A 308 to be put on hold, while processing requests being received at set B 304 continue to be processed 310 using the current (published) version. Set A application servers 302 are upgraded 312, while set B application servers 304 are retired 314 for a potential upgrade. Upon retirement of set B 304, any processing requests now being received at set B 304 are put in spin mode B 316 to be put on hold.

Meanwhile, in one embodiment, the published version (e.g., as published by the database associated with or the system that runs the cluster of application servers 302, 304) is changed to the new version 318 to correspond to the newly-upgraded version of the application servers belonging to set A 306. With the updating of the publish version 318, spin mode A is ended 320 so that the application servers of set A 302 can now resume processing 322 of any processing requests at set A 302. These processing requests are processed 322 using the new upgraded version of the application servers of set A 302, while the application servers of set B 304 are upgraded 324 to the new version. Once the upgrade of the application servers of set B 304 is completed 326, spin mode B is also terminated 328 so that the processing request on hold and any new processing requests can be processed 330 at the application severs of B 304 using the new published version. The transaction sequence 300 ends as all clustered application servers 302, 304 are upgraded to the new version and can now process their respective processing requests based on the new version, which is also the published version.

Figure 4:
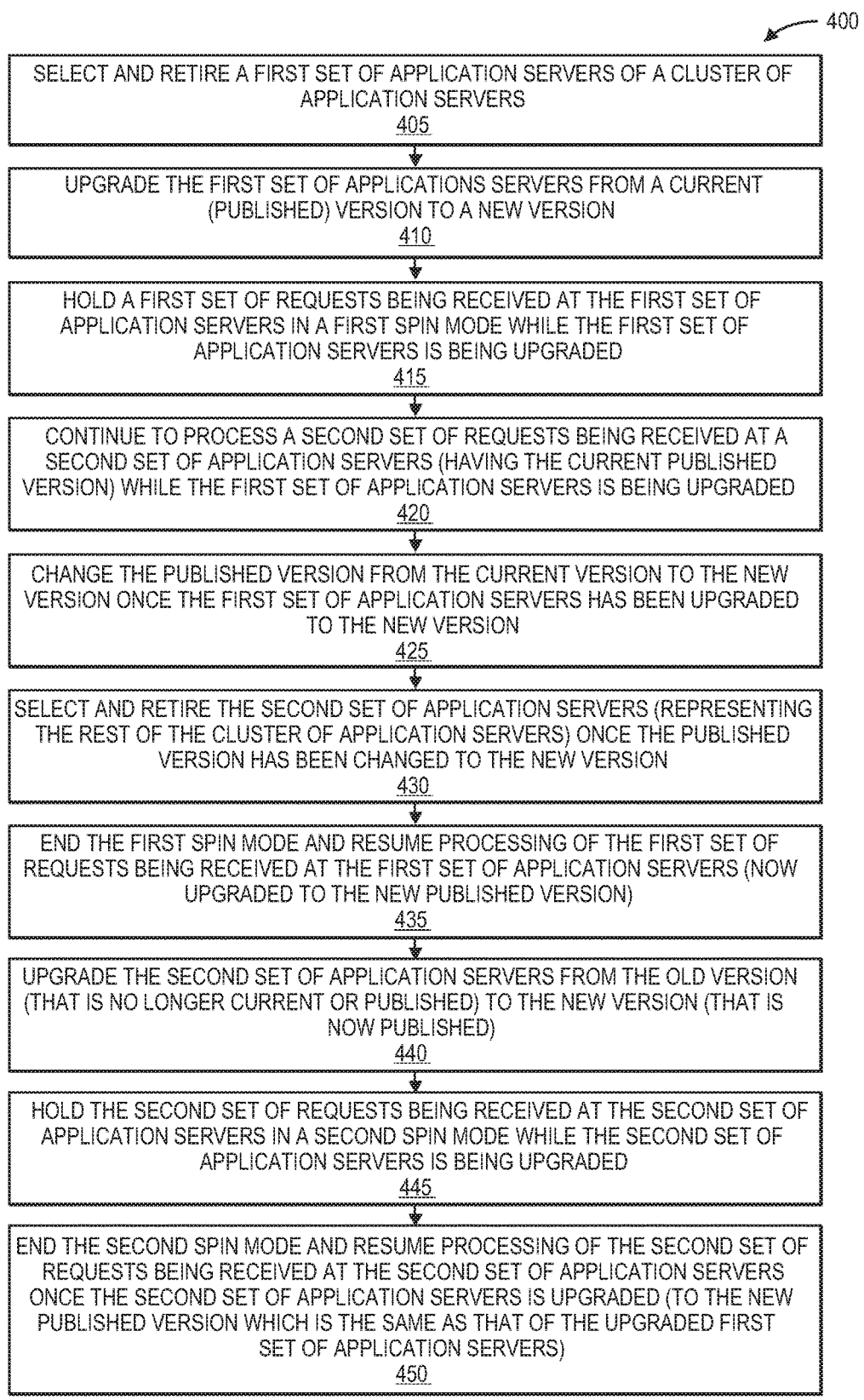
FIG. 4 illustrates a method for spin mode-based dynamic updating of application servers using a spin mode update mechanism according to one embodiment.

FIG. 4 illustrates a method for spin mode-based dynamic updating of application servers using a spin mode update mechanism according to one embodiment. Method 400 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 400 is performed by the spin mode update mechanism 110 of FIG. 1.

Method 400 beings at block 405 with selecting and retiring a first set of application servers of a cluster of application servers. At block 410, the first set of applications servers is upgraded from a current (published) version to a new version. At block 415, a first set of requests being received at the first set of application servers is held (from being processed) in a first spin mode while the first set of application servers is being upgraded. At block 420, a second set of requests being received at a second set of application servers (having the current published version) are continuously processed as the first set of application servers is being upgraded. At block 425, the published version is updated or changed from the current version to the new version once the first set of application servers has been upgraded to the new version.

At block 430 the second set of application servers (representing the rest of the cluster of application servers) is selected and retired once the published version has been changed to the new version. At block 435, first spin mode is ended and the processing of the first set of requests being received at the first set of application servers (now upgraded to the new published version) is resumed. At block 440, the second set of application servers is upgraded from the old version (that is no longer current or published) to the new version (that is now published). At block 445, the second set of requests being received at the second set of application servers is held (from being processed) in a second spin mode as the second set of application servers is being upgraded. At block 450, the second spin mode is terminated and the processing of the second set of requests being received at the second set of application servers is resumed once the second set of application servers is upgraded (to the new published version which is the same as that of the upgraded first set of application servers).

Figure 5:
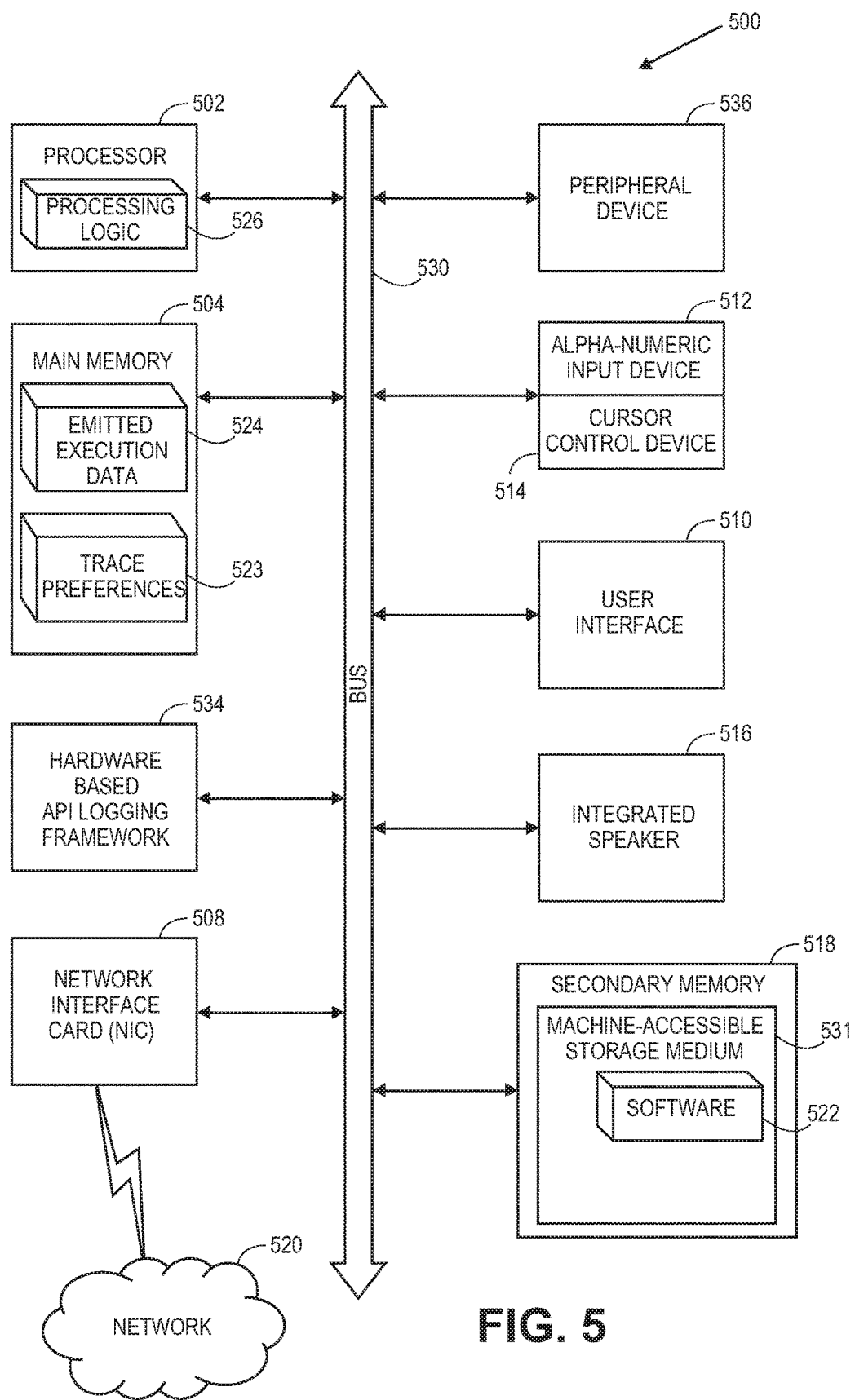
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing device 100 of FIG. 1. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of dynamic visual workflow mechanism 110 as described with reference to FIGS. 1 and 2 and other figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of dynamic visual workflow mechanism 110 as described with reference to FIGS. 1 and 2 and other figures described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments of the present invention may be provided as a computer program product, which may include a computer-readable medium having stored thereon computer program instructions, which may be used to program a computer (or other electronic devices) to perform a process according to the embodiments of the present invention. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

Figure 6:
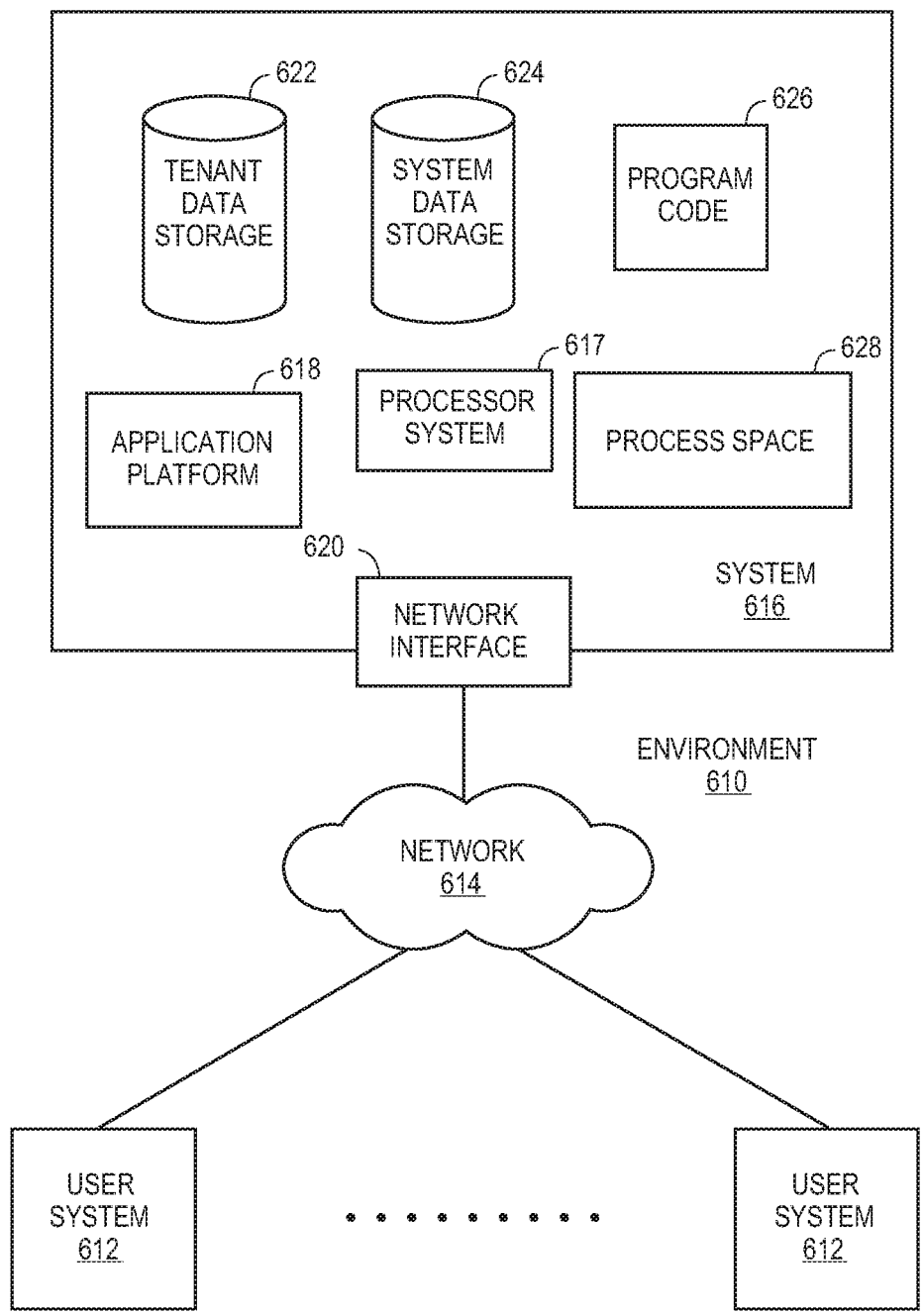
FIG. 6 illustrates a block diagram of an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP)

enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
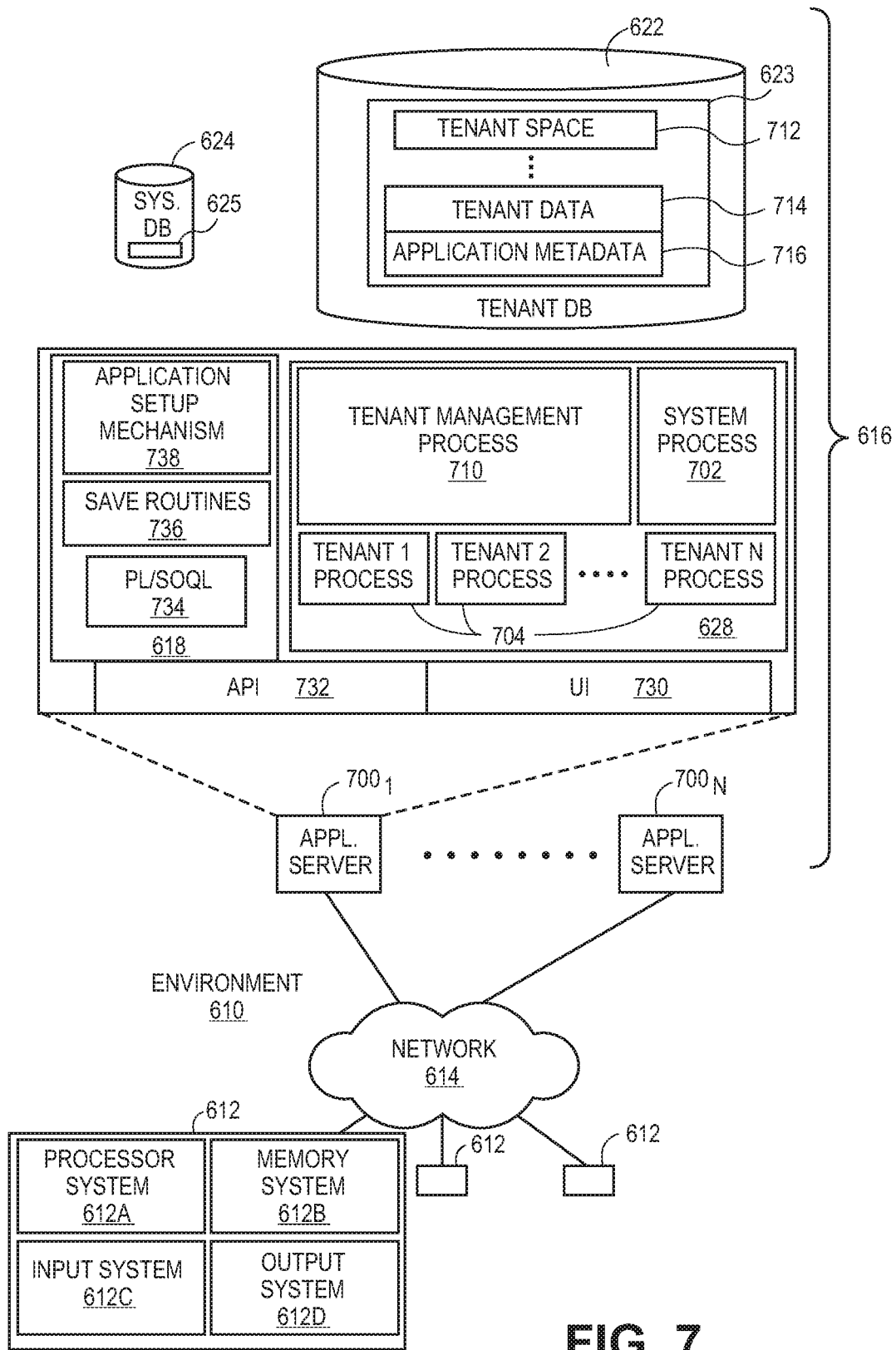
FIG. 7 illustrates a block diagram of an embodiment of elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A database system-implemented method, comprising:
retiring, by the database system, a first computing device of a cluster of computing devices for upgrading from a first current version to a first new version;
dynamically holding, by the database system, a first processing request, set to be processed by the first new version, in a wait stage while the first computing device is retired to be upgraded to the first new version;
continue facilitating, by the database system, uninterrupted processing of a second processing request by a second current version of a second computing device of the cluster of computing devices while the first computing device remains retired;
upgrading, by the database system, the first computing device from the first current version to the first new version;
selectively routing, by the database system, the first processing request from the wait stage to the first computing device such that the first processing request is processed by the first new version of the first computing device;
retiring the second computing device from the cluster of computing device to be upgraded to the second new version;
holding, in a second wait stage, a third processing request to be processed by the second new version of the second computing device; and
selectively routing the third processing request from the second wait stage to the second computing device such that the third processing request is processed by the second new version of the second computing device.

2. The method of claim 1, further comprising:
prior to upgrading the first computing device to the first new version, retiring, the first computing device from the cluster of computing devices; and
selecting the second computing device for retirement if the second current version at the second computing device is capable of being upgraded to a second new version.

3. The method of claim 1, wherein the first, second, and third processing requests to initiate one or more tasks relating to one or more tenants of a plurality of tenants in a multi-tenant environment, wherein the first, second, and third processing requests are placed by one or more users on behalf of the one or more tenants.

4. The method of claim 1, wherein the first and second current versions and the first and second new versions refers to one or more versions of one or more software applications at one or more computing devices of the cluster of computing devices, wherein the one or more computing devices comprise the first and second computing devices including application servers.

5. A system comprising a processing device and memory coupled with the processing device, wherein the processing device to facilitate operations comprising:
retiring a first computing device of a cluster of computing devices for upgrading from a first current version to a first new version;
dynamically holding a first processing request, set to be processed by the first new version, in a wait stage while the first computing device is retired to be upgraded to the first new version;
continuously facilitating uninterrupted processing of a second processing request by a second current version of second computing device of the cluster of computing devices while the first computing device remains retired;
upgrading the first computing device from the first current version to the first new version;
selectively routing the first processing request from the wait stage to the first computing device such that the first processing request is processed by the first new version of the first computing device;
retiring the second computing device from the cluster of computing device to be upgraded to the second new version;
holding, in a second wait stage, a third processing request to be processed by the second new version of the second computing device; and
selectively routing the third processing request from the second wait stage to the second computing device such that the third processing request is processed by the second new version of the second computing device.

6. The system of claim 5, wherein the operations further comprise:
prior to upgrading the first computing device to the first new version, retiring, the first computing device from the cluster of computing devices; and
selecting the second computing device for retirement if the second current version at the second computing device is capable of being upgraded to a second new version.

7. The system of claim 5, wherein the first, second, and third processing requests to initiate one or more tasks relating to one or more tenants of a plurality of tenants in a multi-tenant environment, wherein the first, second, and third processing requests are placed by one or more users on behalf of the one or more tenants.

8. The system of claim 5, wherein the first and second current versions and the first and second new versions refers to one or more versions of one or more software applications at one or more computing devices of the cluster of computing devices, wherein the one or more computing devices comprise the first and second computing devices including application servers.

9. A non-transitory machine-readable medium having instructions which, when executed by a machine, cause the machine to perform one or more operations comprising:

retiring a first computing device of a cluster of computing devices for upgrading from a first current version to a first new version;

dynamically holding a first processing request, set to be processed by the first new version, in a wait stage while the first computing device is retired to be upgraded to the first new version;

continuously facilitating uninterrupted processing of a second processing request by a second current version of second computing device of the cluster of computing devices while the first computing device remains retired;

upgrading the first computing device from the first current version to the first new version;

selectively routing the first processing request from the wait stage to the first computing device such that the first processing request is processed by the first new version of the first computing device;

retiring the second computing device from the cluster of computing device to be upgraded to the second new version;

holding, in a second wait stage, a third processing request to be processed by the second new version of the second computing device; and selectively routing the third processing request from the second wait stage to the second computing device such that the third processing request is processed by the second new version of the second computing device.

10. The non-transitory machine-readable medium of claim 9, wherein the operations further comprise:

prior to upgrading the first computing device to the first new version, retiring, the first computing device from the cluster of computing devices; and selecting the second computing device for retirement if the second current version at the second computing device is capable of being upgraded to a second new version.

11. The non-transitory machine-readable medium of claim 9, wherein the first, second, and third processing requests to initiate one or more tasks relating to one or more tenants of a plurality of tenants in a multi-tenant environment, wherein the first, second, and third processing requests are placed by one or more users on behalf of the one or more tenants.

12. The non-transitory machine-readable medium of claim 9, wherein the first and second current versions and the first and second new versions refers to one or more versions of one or more software applications at one or more computing devices of the cluster of computing devices, wherein the one or more computing devices comprise the first and second computing devices including application servers.

* * * * *